(12) United States Patent
Crockett et al.

(10) Patent No.: US 7,813,487 B2
(45) Date of Patent: Oct. 12, 2010

(54) SYSTEM AND METHOD FOR BILLING TELEPHONE CALLS

(75) Inventors: Susanne M. Crockett, Buffalo Grove, IL (US); Robert B. Lasken, Schaumburg, IL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1221 days.

(21) Appl. No.: 11/228,613

(22) Filed: Sep. 15, 2005

(65) Prior Publication Data

US 2006/0062364 A1    Mar. 23, 2006

Related U.S. Application Data

(60) Provisional application No. 60/610,152, filed on Sep. 15, 2004.

(51) Int. Cl.
    H04M 15/00    (2006.01)
(52) U.S. Cl. .............................. 379/114.24; 379/114.05; 379/114.28; 379/115.01; 379/121.01; 379/126
(58) Field of Classification Search ............ 379/114.01, 379/114.05, 114.24, 114.28, 121.01, 115.01, 379/115.03, 114.14, 126
See application file for complete search history.

(56) References Cited

U.S. PATENT DOCUMENTS

| | | | |
|---|---|---|---|
| 4,788,719 A | | 11/1988 | Gupta |
| 5,432,845 A | | 7/1995 | Burd et al. |
| 5,517,560 A | | 5/1996 | Greenspan |
| 5,590,186 A | | 12/1996 | Liao et al. |
| 5,617,448 A | * | 4/1997 | Bolinger, Jr. et al. ... 379/114.24 |
| 5,617,471 A | | 4/1997 | Rogers et al. |
| 5,850,432 A | | 12/1998 | Desai et al. |
| 5,875,237 A | * | 2/1999 | Bolinger, Jr. et al. ... 379/114.14 |
| 6,026,151 A | * | 2/2000 | Bauer et al. ............ 379/114.24 |
| 6,212,264 B1 | | 4/2001 | Kim |
| 6,222,912 B1 | * | 4/2001 | Breuer .................... 379/114.24 |
| 6,298,127 B1 | * | 10/2001 | Petrunka .................... 379/126 |

(Continued)

*Primary Examiner*—Binh K Tieu
(74) *Attorney, Agent, or Firm*—Jackson Walker L.L.P.

(57) ABSTRACT

A method and system are provided for use in billing a toll-free telephone call over a telephone network, the telephone call corresponding to a first toll-free telephone number and initiated by a calling party from an initiating telephone number. In one embodiment, a toll-free telephone call is received at a service node, and routed to a first termination corresponding with the first toll-free telephone number, where the service node remains within the call path of the toll-free telephone call. A first call record is initiated for the toll-free telephone call at the service node, and it is determined at the service node whether the toll-free telephone call is to be connected with a second toll-free telephone number. A second call record is initiated at the service node, where a connection with a second termination corresponding with the second toll-free telephone number has been established. In another embodiment, the toll-free telephone call is received at a service node, and a termination is determined for the toll-free telephone call. The toll-free telephone call is routed by the service node to the termination, where the service node remains within the call path of the toll-free telephone call. The service node initiates a call record for the toll-free telephone call, the call record including an indication to bill the toll-free telephone call to a billing toll-free telephone number different from the first toll-free telephone number.

26 Claims, 8 Drawing Sheets

U.S. PATENT DOCUMENTS

| | | |
|---|---|---|
| 6,654,451 B1 | 11/2003 | Ward |
| 6,768,793 B1 | 7/2004 | Sbisa et al. |
| 2002/0136389 A1 | 9/2002 | Fleischer, III et al. |
| 2003/0235284 A1 | 12/2003 | Fleischer, III et al. |
| 2006/0062364 A1 | 3/2006 | Crockett et al. |
| 2006/0093112 A1 | 5/2006 | Book et al. |
| 2007/0160185 A1* | 7/2007 | Taylor et al. ........... 379/114.13 |

* cited by examiner

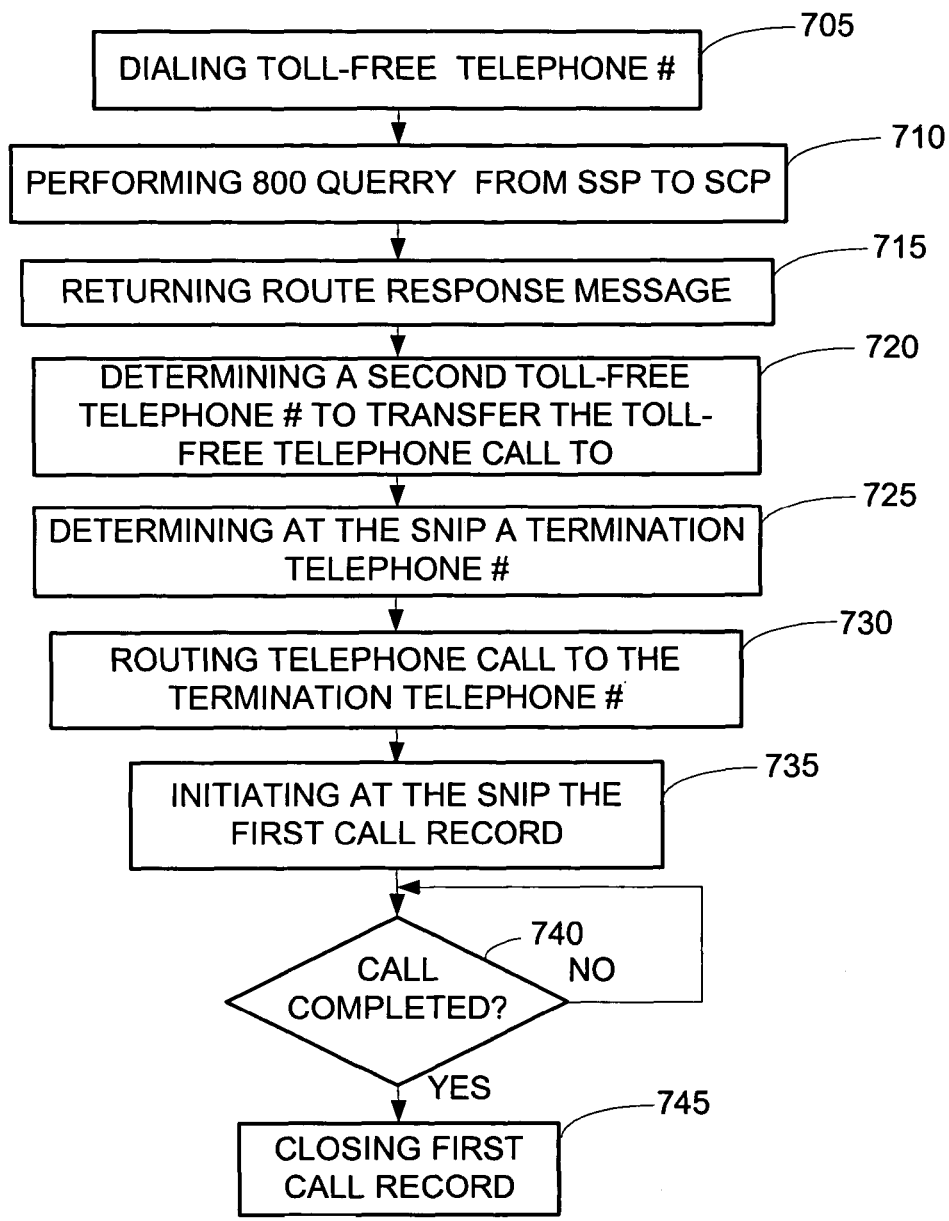

SYSTEM AND METHOD FOR BILLING TELEPHONE CALLS

CROSS-REFERENCE TO RELATED APPLICATIONS

This patent document claims the benefit of the filing date under 35 U.S.C. §119(e) of Provisional U.S. Patent Application Ser. No. 60/610,152, entitled "System and Method For Billing Telephone Calls" to Crockett et al., that was filed on Sep. 15, 2004, and is hereby incorporated by reference herein.

TECHNICAL FIELD

This disclosure is directed to the public switched telephone network, and more particularly, to a system and method for billing toll-free telephone calls over the public switched telephone network.

BACKGROUND ART

When billing for a toll-free telephone call, the service switching point (SSP) handling the toll-free telephone call queries a service control point (SCP) to determine where (i.e., which terminating telephone number) to route the toll-free telephone call. The SCP returns routing instructions to the SSP as to how the toll-free call is to be routed. The SSP then routes the telephone call to the telephone number indicated by the SCP. Upon the telephone call being answered at the terminating telephone number location, the SSP maintains information including the calling party telephone number, the terminating telephone number, how long the telephone call lasts, and the toll-free telephone number. This information is used when billing the toll-free telephone number holder for the charges incurred on their toll-free telephone number.

Often, a company may provide a single, nation-wide, toll-free telephone number for use in contacting its many divisions and/or departments. Calling that toll-free telephone number typically results in an automatic transfer to another toll-free telephone number that is more appropriate for the particular calling party. For example, a transfer to a toll-free telephone number corresponding to a company division that may be geographically appropriate for serving the calling party may occur, transparent to the calling party. In the alternative, the calling party may be provided, via a company operator or an Interactive Voice Response Unit, the option of selecting a particular department of the company, such as customer service, to which the toll-free telephone call is transferred. In such cases, billing for the entire toll-free telephone call is charged to the nation-wide toll-free telephone number. Such billing renders it difficult for the company to allocate charges for the nation-wide toll-free telephone number to the various divisions or departments of the company to which the call was transferred.

In some circumstances, a company may provide multiple toll-free telephone numbers that may be used by customers to contact various departments or divisions of the company. Calls to each toll-free telephone number are billed to the company via the respective toll-free telephone number dialed. However, especially where the company desires all toll-free telephone billings to be handled by a common company division or department, telephone billing in such fashion renders it difficult for the company to collect all billings at the common division or department.

In some circumstances, the toll-free telephone call is transferred from the terminating telephone number to another toll-free telephone number. In this case, it is desirable to allocate telephone usage charges between the dialed toll-free telephone number and the toll-free telephone number to which the toll-free telephone call was transferred or conferenced. In one case, portions of the toll-free telephone call usage for each toll-free telephone number is billed at respective SSPs of the telephone network handling respective legs of the toll-free telephone call. However, such billing consumes public switched telephone network (PSTN) resources, and renders re-association of the billing records for the various call legs difficult.

BRIEF DESCRIPTION OF SEVERAL VIEWS OF THE DRAWINGS

FIG. 7 is a flowchart illustrating operation of the telephone network of FIG. 1 in providing toll-free telephone call billing, where a toll-free telephone call to a toll-free telephone number is billed to a billing toll-free telephone number other than the dialed toll-free telephone number, in accordance with another embodiment of the disclosure;

FIG. 8 illustrates an exemplary call record that may result from the billing described in the flowchart of FIG. 6, in accordance with an embodiment of the disclosure.

DETAILED DESCRIPTION OF THE PREFERRED EMBODIMENT

Figure 1:
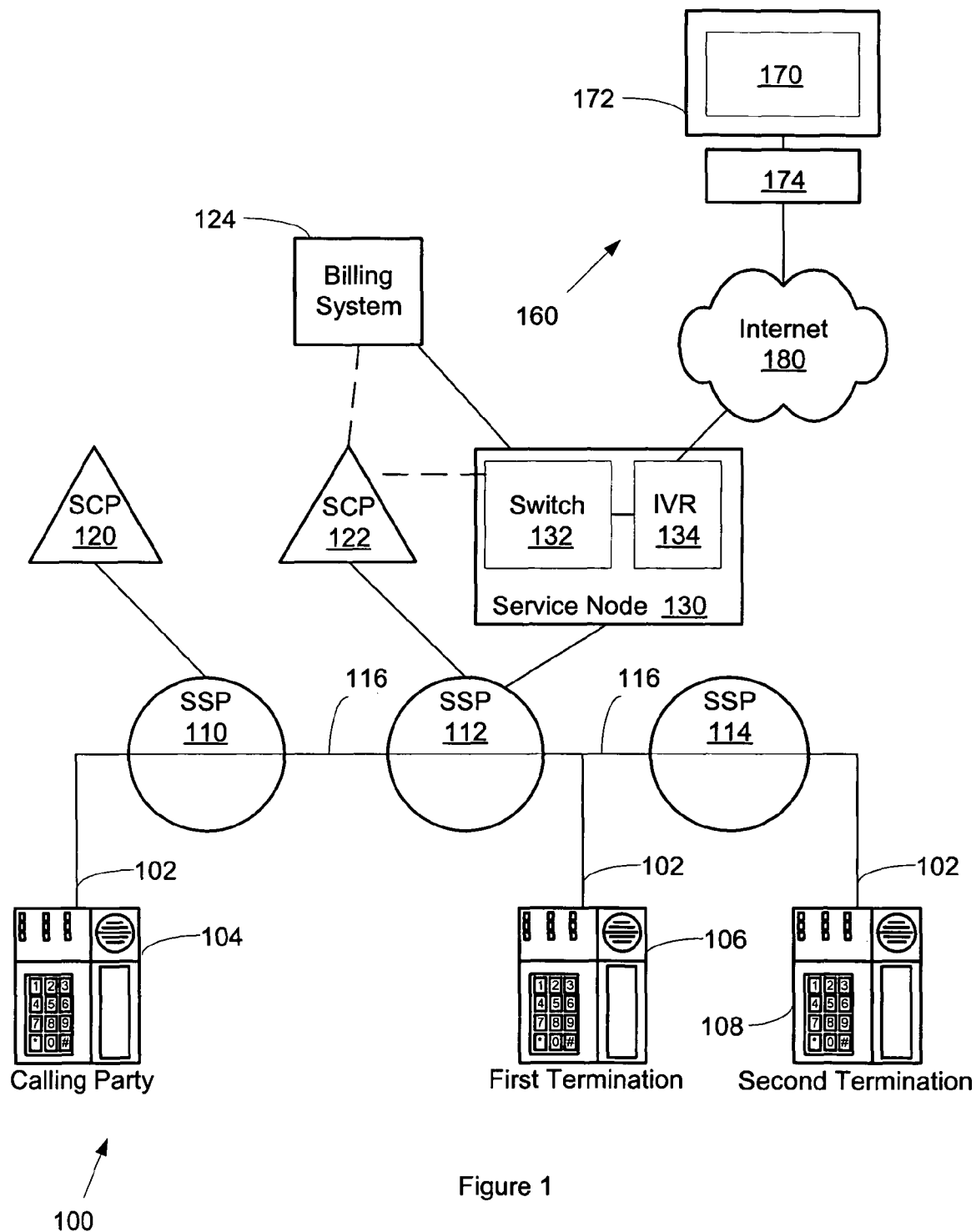
FIG. 1 is a block diagram of a telephone network that may be used in billing a toll-free telephone call, in accordance with an embodiment of the disclosure.

A method and system are provided for use in billing a toll-free telephone call over a telephone network, the telephone call corresponding to a first toll-free telephone number and initiated by a calling party from an initiating telephone number. A toll-free telephone call is received at a service node, and is routed to a first termination corresponding with the first toll-free telephone number, where the service node remains within the call path of the toll-free telephone call. A first call record is initiated for the toll-free telephone call at the service node, and it is determined at the service node whether the toll-free telephone call is to be connected with a second toll-free telephone number. A second call record is initiated at the service node, where a connection with a second termination corresponding with the second toll-free telephone number has been established.

In accordance with another embodiment of the disclosure, a system and method are provided for use in billing a toll-free telephone call over a telephone network, the telephone call corresponding to a first toll-free telephone number dialed by a calling party from an initiating telephone number. The toll-free telephone call is received at a service node, a termination is determined for the toll-free telephone call, and the toll-free telephone call is routed by the service node to the termination, where the service node remains within the call path of the toll-free telephone call. The service node initiates a call record for the toll-free telephone call, the call record including an indication to bill the toll-free telephone call to a billing toll-free telephone number different from the first toll-free telephone number.

Having the system and method for billing toll-free telephone calls allows toll-free billing to multiple toll-free telephone numbers in the case of a transfer or conference between the calling party and additional toll-free telephone numbers during the toll-free telephone call, through the generation of call records for each toll-free number involved in the toll-free telephone call. In addition, as the call records are generated at the service node, Public Switched Telephone Network (PSTN) resources need not be consumed by messages generated between multiple service switching points (SSPs) to accomplished billing for the telephone call. Further, complex programming infrastructure need not be implemented to re-associate multiple call records for various legs of the telephone call, in contrast to where multiple SSPs bill respective legs of a toll-free telephone call. Additionally, SSP call records are not needed for the toll-free telephone call billing, and the service node/intelligent peripheral (SNIP) and/or SCP may provide more detailed billing capabilities than those generated by the SSP. In addition, call record generation at the service node allows a toll-free telephone call to be billed to a toll-free number other than the dialed toll-free telephone number.

The capabilities for billing to different toll-free telephone numbers during a telephone call is advantageous, especially where the toll-free telephone numbers are owned by different companies. Certain billing information, such as billing call usage for a portion of the toll-free telephone call to another company's toll-free telephone number, often cannot be transferred from one company to another without a legal contract to do so. The capabilities for billing a toll-free telephone call to a billing toll-free telephone number other than the dialed toll-free telephone number is advantageous as it allow a toll-free telephone number holder, such as a company, to better manage and tailor toll-free telephone call billing to the particular company's needs.

A block diagram of an exemplary telephone network 100 that may be used in billing a telephone call is shown in FIG. 1, in accordance with an embodiment of the disclosure. As shown in FIG. 1, a plurality of telephone lines 102 are shown, connecting a plurality of telephone network locations 104, 106 and 108 via service switching points (SSPs) 110, 112 and 114 respectively. The SSPs 110, 112 and 114 are connected via trunked communications lines 116, which are used to connect and carry communications signals, for example, voice and/or data, between two or more of the telephone network locations 104, 106 and 108.

Service control points (SCPs) 120 and 122 may be coupled with SSPs 110 and 112, respectively, and provide advanced intelligent network (AIN) capabilities to the telephone network, as well as routing information to the SSPs of the telephone network describing how a telephone call from a calling party to a called party is to be routed. A billing system server is shown at 124, and may be coupled with one or more of the SCPs, for example, the SCP 122. The billing server 124 may be any billing server that is commonly known, that is capable of receiving billing information and providing the billing information to a long distance carrier for the generation of call records. For example, the billing server may be a billing server manufactured by Telegence System, having billing functionalities including, but not limited to, Audit and Control, Account Receivable, Billing Account Number, Bill Formatter, Customer Service Management, Enterprise Data Warehouse, Error Management System, End Of Day, Flexible Bill Formatter, General Ledger, Invoice Ready, Local Exchange carrier (LEC), LEC Formatting and Interface, Message Acquisition and Formatting, Message Processing System, Network Data Mover, Preferred Interexchange Carrier, Unauthorized, Update, and Telecom Business Solution capabilities.

A SNIP 130 may be coupled with an SSP, for example, the SSP 112, an SCP, for example, the SCP 122, and the billing server 124. The SNIP 130 may communicate with the SSP 112 using SS7 protocols, and the SNIP 130 may communicate with the SCP 122 and/or the billing server 124 using the file transfer communications protocol. Other communication protocols may be employed, for example, the Intelligent Network Application Protocol (INAP) communications protocol. Toll-free telephone calls may be routed/looped through the SNIP 130 placing the SNIP 130 into the call path, for example, as described further below.

The SNIP 130 may include switching and interactive voice response unit (IVR) capabilities, as well as capabilities for use in billing a toll-free telephone call, for example, by generating multiple call records for the toll-free call, or by working in conjunction with a SCP in generating multiple call records for the toll-free telephone call, and by generating a call record for use in billing a toll-free telephone call to another toll-free telephone number not involved in the voice path of the toll-free telephone call. For example, the SNIP may include a SNIP switch 132 (i.e., a SNIP SSP), capable of interfacing with an external SSP (i.e., the SSP 112) to receive incoming toll-free telephone calls from a calling party directed to the SNIP, and for routing the incoming telephone call through the SNIP 130 to the first terminating telephone number corresponding with the first toll-free telephone number. The SNIP 130 may further have capabilities for initiating transfer and/or conferencing of the incoming call with an additional telephone number(s).

The SNIP switch 132 is coupled with an IVR 134 that provides touchtone and/or voice response capabilities that may be used at the SNIP for performing conferencing or transferring of telephone calls from the first termination telephone number to an additional telephone number, for example, a second termination telephone number corresponding to a second toll-free telephone number. The IVR 134 may have capabilities, for example, for playing pre-recorded messages or performing text-to-speech reading of messages to a calling party, and for detecting signals within the telephone call indicating that a conference or transfer of the telephone call is desired. Such signals may include, for example, DTMF tones entered during the telephone call indicating a desire by one of the calling party or called party that a conference or transfer is desired. The conferencing or transferring of telephone calls by the SNIP 130 may be accomplished, for example, in a similar fashion as described with respect to the conferencing and/or transferring accomplished by the platform 130 in U.S. patent application Ser. No. 11/191,342, entitled "Subscriber Alterable Call Transfer Service," to Crockett et al., filed on Jul. 27, 2005, and hereby incorporated in its entirety by reference herein. A more detailed block diagram of the SNIP 130 will be discussed below, with respect to the block diagram of FIG. 2.

The IVR 134 may further communicate with a service host generally shown at 160 to provide a subscription interface, for example, allowing the modification of various billing options for a toll-free telephone number, as well as other telephone service features, to be accomplished. The service host 160 may comprise a display 172 and a controller such as a computer 174, capable of displaying one or more graphic user interfaces (GUIs) 170 that may be used to modify service subscriptions and billing options, for example, for a toll-free telephone subscriber. The service host 160 may communicate with the IVR 134, for example, via the Internet 180.

Figure 2:
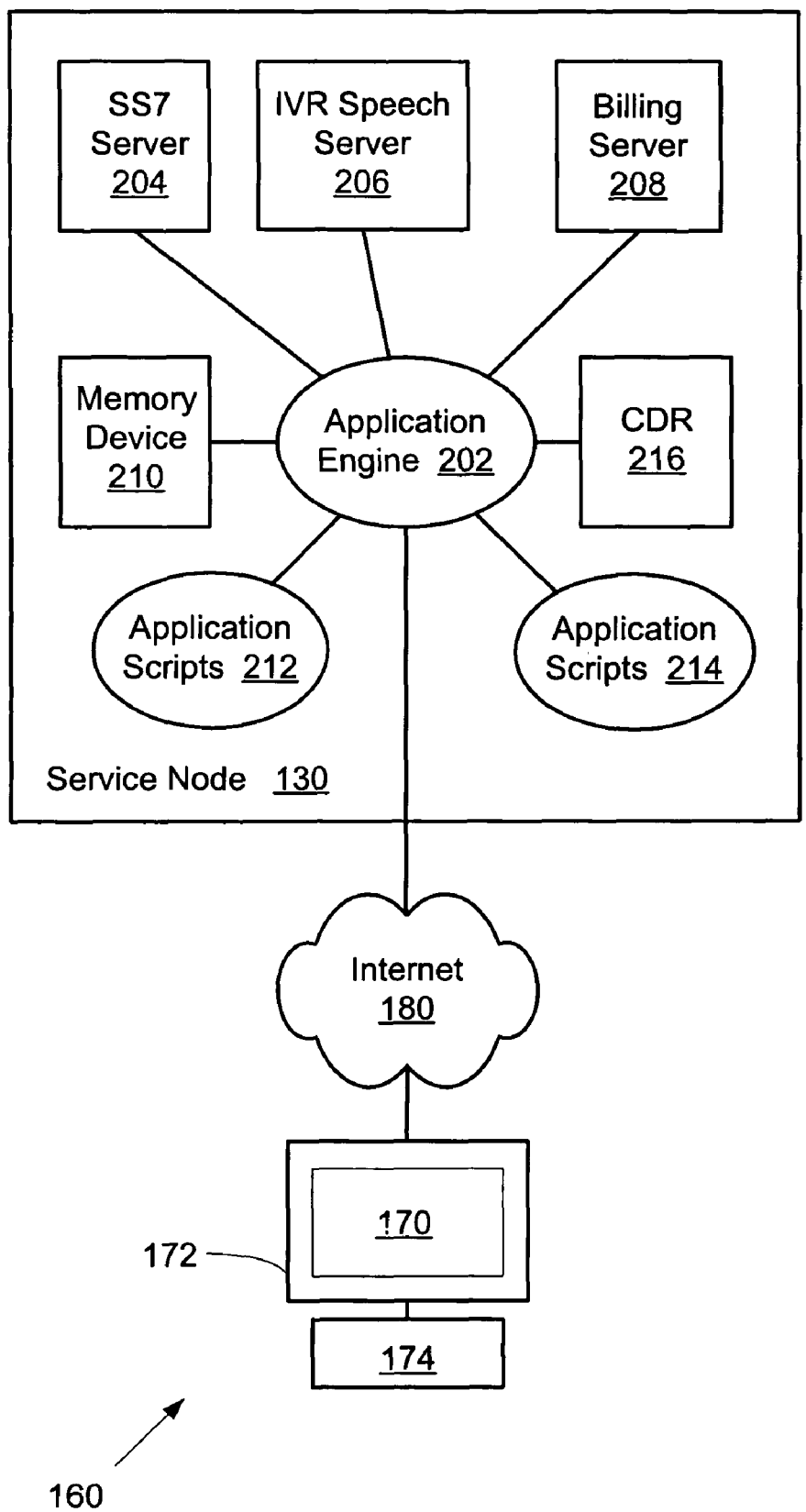
FIG. 2 is a block diagram of a service node that may be used in billing a toll-free telephone call, in accordance with an embodiment of the disclosure.

FIG. 2 is a block diagram of the SNIP 130 of FIG. 1, that may be utilized in billing a toll-free telephone call, in accordance with an embodiment of the disclosure. As shown in FIG. 2, the switch 132 and IVR 134 of the SNIP 130 may be implemented as an applications engine 202, coupled with SS7, IVR speech and billing servers 204, 206 and 208, respectively. The application engine 202 may further be coupled with a memory device 210 (i.e., including one or more databases used in the billing of a toll-free telephone call, or other services provided by the SNIP 130), and one or more applications scripts 212, 214 that maintain programming that may be used by the application engine 202 in carrying-out the functionality of the SNIP 130, for example, in the billing of toll-free telephone calls, as described in detail below. The memory device 210 may be implemented as one or more computer readable medium (CRM) capable of providing the short term or the long term storage of information, including but not limited to, floppy disks, conventional hard disks, any volatile or nonvolatile ROMs including PROM, EPROM, EEPROM, CD-ROM, any RAM including SRAM, DRAM, and SDRAM, or any memory device derived therefrom, as will be appreciated by one skilled in the art. Although shown separate from the memory device 210, the application scripts 212, 214 may reside at the memory device 210, or at any other memory device within, or in communication with, the SNIP 130.

The application engine 202 may be coupled with the service host 160, for example, where the application engine 202 communicates with the service host 160 to provide any modifications for billing a toll-free telephone call, or other telephone services that may be provided to telephone subscribers. The service host 160 may communicate with the application engine 202, for example, via the Internet 180.

The application engine 202, for example, via the application scripts 212 and/or 214, provide functionality for monitoring a toll-free telephone call routed through the SNIP 130 to the first termination telephone number for a transfer or conferencing of the telephone call to a second terminating telephone number corresponding to a second toll-free telephone number. The application engine 202 may further provide functionality for maintaining billing information (i.e., initiating telephone number, first toll-free telephone number, first terminating telephone number, and a connection time between the initiating and first telephone numbers) for use by the billing server 208 in generating a first call record for the connection between the initiating telephone number and the first termination telephone number. In addition, the application engine 202 may provide functionality for maintaining billing information (i.e., initiating telephone number, second toll-free telephone number, second terminating telephone number, and a connection time between the initiating and second telephone numbers) for use by the billing server 208 in generating a second call record for the connection between the initiating telephone number and the second termination telephone number. Where desired, the application engine 202 may have capabilities for transferring one or more pieces of billing information to a SCP, for example, the SCP 122, where the SCP has capabilities for generating a first and second call record, as described below. Further, or in the alternative, the application server 202 may have capabilities for maintaining billing information for use by the billing server 208 in generating a call record for a toll-free telephone call to a toll-free telephone number, such that the toll-free telephone call is billed to a billing toll-free telephone number not involved in (i.e., not a party to) the toll-free telephone call.

The application engine 202 may comprise, for example, one or more controllers (not shown) capable of providing billing capabilities alone, or in conjunction with the billing server 208, the controller(s) operating under one or more application scripts 212, 214, providing programming for controlling operation of the application engine 202 and billing server 208 in providing the billing capabilities described herein, or other services that may be provided at the SNIP 130. The Signal System 7 (SS7) server 204 has capabilities for parsing received SS7 messages, and for generating SS7 messages, for example, to communicate to the SSP 112 to indicate that a received telephone call from a calling party is to be placed on hold, transferred, conferenced or returned to a menu routing application. The SS7 server 204 may further have capabilities of (i.e., be programmed for) communicating using the INAP communication protocol, for example, to communicate billing information to an SCP using some predetermined convention.

The IVR server 206 has capabilities for providing the IVR functionality discussed herein, such as for providing text-to-speech messages or pre-recorded messages to a calling party, and for receiving signals, such as DTMF tone sequences, indicating a desire for a conference or transfer of the telephone call placed over the first toll-free telephone number. The billing server 208 may, in conjunction with the application engine 202, be used to handle the generation and storage of call records and billing information for the SNIP 130, where the billing information may be stored in a memory device such as Compact Disc Recordable device 216, or the memory device 210 of the SNIP 130. The billing server 208 may further provide a communications interface between the SNIP and the billing server 124. For example, the billing server 208 may be utilized to interface with the billing server 124, as well as perform any necessary translations of call records to an appropriate format for sending to the billing server 124, as will be appreciated by one skilled in the art. Although not shown, additional or alternative servers may be provided, where it is desirable to communicate with an SSP or other telephone network equipment external to the SNIP, for example, using AIN, Internet or other communication protocols.

As would be appreciated by one skilled in the art, each of the SS7, IVR and billing servers 204, 206 and 208, respectively, may be implemented using separate controllers operating under separate programming, for example, provided from memory devices present within the respective servers. The servers 204, 206 and 208 are capable of communicating with the applications engine 202 under one or more communications protocols, as would be appreciated by one skilled in the art. In the alternative, the functionality provided by the servers 204, 206 and 208 may be implemented at the applications engine 202, through one or more controllers. Further, the applications engine has capabilities for communicating with the service host 160, for example, using PPP, TCP/IP, or other known communication protocols, as would be appreciated by one skilled in the art.

The SNIP 130 discussed above may be implemented, for example, as a Readi800 topology, created and maintained by United States Advanced Networks. Such a topology may include, for example, a Readi800 Web Server having capabilities for communicating with the service host 160, a Readi800 Application database and Tomcat Server having firewall capabilities to protect the SNIP 130 and telephone network 100 from unwelcome access and attacks from unauthorized users, Readi800 Call Processing Equipment, and Internet routing capabilities. The components of the SNIP 130 may be coupled, for example, by Ethernet connections, using Cat 5 cable, or by any other fashion allowing the various components within the SNIP 130 to communicate with one another.

Using the SNIP 130 described above, multiple call records may be generated during a telephone call that is transferred from a first toll-free telephone number to a second toll-free telephone number, without using the switch (SSP) generated call records. The SSP generated call records may be compared with those generated by the SNIP 130 to determine which SSP call records are duplicates, and thus may be discarded. The capability to provide multiple call records may be provided as a service to a subscriber (i.e., the toll-free telephone number subscriber). In the alternative, the capability to provide multiple call records for a toll-free telephone call may be provided in conjunction with any toll-free telephone number. Further, and as described below, the SNIP 130 may have capabilities for generating a call record used for billing a toll-free telephone call to a billing toll-free telephone number not involved with the toll-free telephone call.

To generate multiple call records for a toll-free telephone call from a calling party at the initiating telephone number (i.e., network location 104) to the first termination (i.e., network location 106), the toll-free telephone call is routed/looped through the SNIP 130 to the first termination 106. The SNIP, for example, the billing server 208, may initiate a first call record for the toll-free telephone call representing billing information for the connection between the initiating telephone number and the first termination. The SNIP "listens in" on the telephone call to determine whether the telephone call to the terminating telephone number has been transferred to or conferenced with another toll-free telephone number, for example, corresponding to a second termination telephone number corresponding to network location 108. Where a transfer or conference is detected, the SNIP 130, for example, the billing server 208, is capable of generating a second call record for the transferred toll-free call to the new toll-free telephone number (i.e., a 2nd termination telephone number). In the case of a call transfer, the first call record may be closed. In the case of a conference with the second termination, the first call record may continue, while the second call record is initiated.

In one embodiment, the SNIP 130 using the billing server 208 may itself generate the call records. In another embodiment, an SCP coupled with the SNIP may generate the call records. In the latter case, the SNIP may communicate with the SCP that the call has been transferred to, or conferenced with, another toll-free telephone number. The SNIP 130 may communicate various billing information to the SCP 122, including, for example, but not limited to, the initiating telephone number, the first and/or second toll-free telephone number(s), the first and/or second termination(s) (i.e., termination telephone number(s)), and begin call and end call connection times between the initiating telephone number and the first and/or second termination(s). Such information may be communicated from the SNIP 130, for example, the SS7 server 204, using the INAP communications protocol, in some predetermined convention for communicating such information. Such information may be used by the SCP to generate a first call record. Where a transfer or conference is detected, the SCP 122 is capable of generating another call record for the transferred toll-free call to the new toll-free telephone number (i.e., a 2nd termination telephone number). In the case of a call transfer, the first call record may be closed by the SCP 122. In the case of a conference with the second termination, the first call record may continue, while the second call record is initiated at the SCP. Generation of call records by both the SNIP and the SCP are discussed in detail below.

Figure 3:
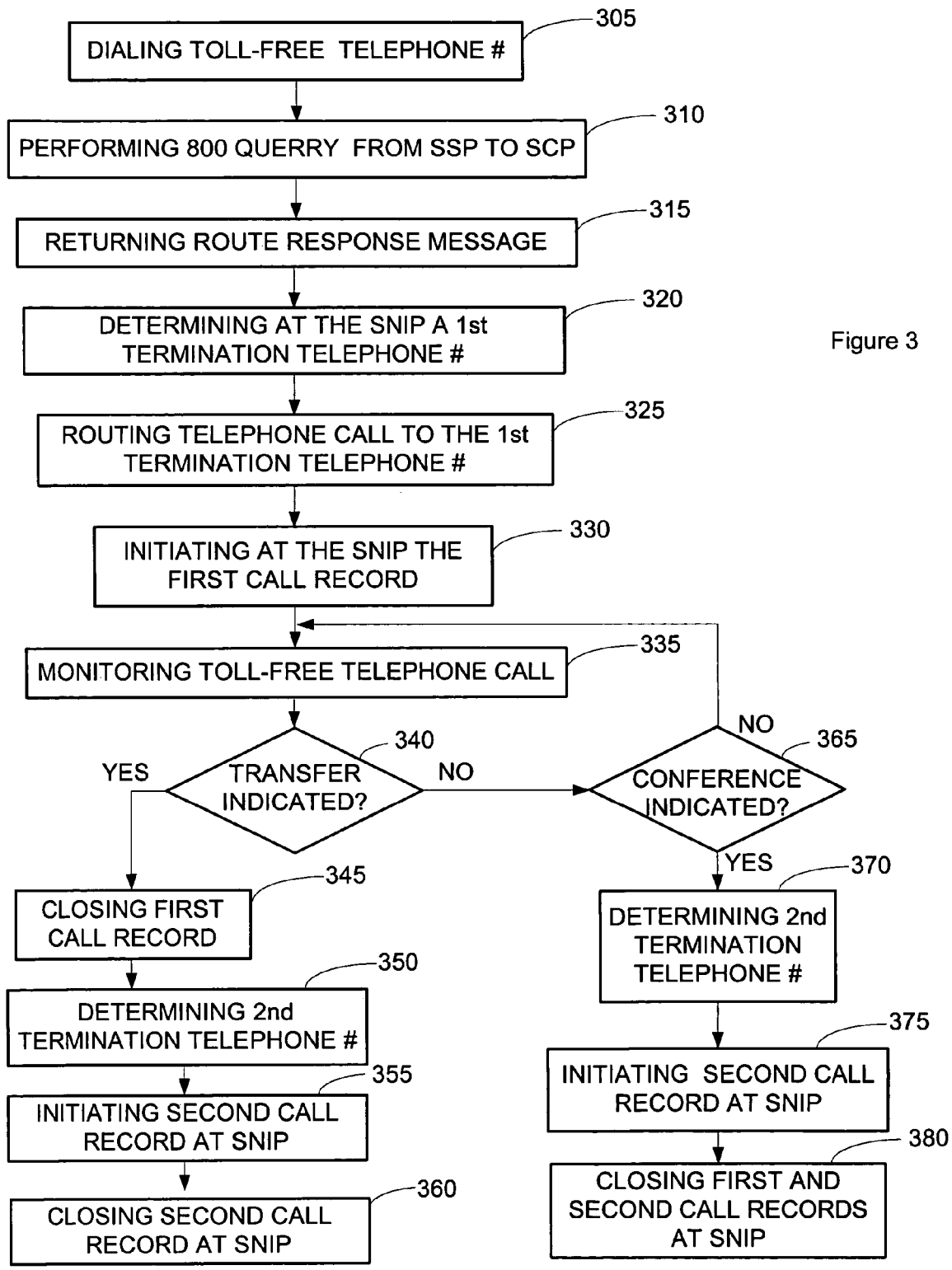
FIG. 3 is a flowchart illustrating operation of the telephone network of FIG. 1 in providing toll-free telephone call billing, where call records are generated at a service node, in accordance with an embodiment of the disclosure.

FIG. 3 is a flow chart illustrating operation of the telephone network of FIG. 1 in billing a toll-free telephone call, in accordance with an embodiment of the disclosure. The flowchart of FIG. 3 will be discussed in relation to the telephone network 100 of FIG. 1, where the SNIP 130 has capabilities for generating call records for billing of the toll-free telephone call.

As shown at box 305, a calling party 104 dials a first toll-free telephone number from an initiating telephone number. At box 310, the SSP 110 performs an 800 query with the SCP 122, for example, utilizing the SS7 communications protocol. At box 315, the SCP 122 returns a routing response message indicating that the toll-free telephone subscriber subscribes to the billing service, and returns an SS7 Analyze Route Message used in the routing of the telephone call to the switch and trunk group serving the SNIP 130 using the SS7 communications protocol. The SNIP then determines the first termination corresponding to the toll-free telephone number at box 320, using logic (i.e., programming at application scripts 212 or 214). The first termination may include a termination telephone number, a switch identification, or a trunk group identification corresponding to the first toll-free telephone number. For the purpose of this application, any discussion regarding the determination of a termination will be in the context of determining a terminating telephone number. However, it will be appreciated by one skilled in the art, that determining a termination may instead, or in addition, include the determination of a termination telephone number, termination switch identification, and/or termination trunk identification.

Determining the terminating telephone number at box 320 may be accomplished, for example, by the SNIP searching an internal database, such as the database within the memory device 210 of the SNIP. The memory device may include, for example, a list of toll-free telephone numbers with corresponding termination telephone numbers. Where the termination is a switch or trunk group identification, similar databases may be maintained at the memory device 210 for use in determining the switch or trunk group identification termination for a particular toll-free telephone number. In the alternative, the SNIP 130 may directly query the SCP 122 for the proper termination number corresponding to the first toll-free telephone number. Such querying may occur via messages of a predetermined convention between the SNIP 130 and the SCP 122, for example, in the form of Intelligent Network Application Protocol (INAP) messages.

Upon determining the first termination telephone number, the SNIP 130 may send an SS7 IAM to a particular portion of the telephone network to initiate the call setup to the first termination telephone number, and routes the telephone call to the first termination (i.e., telephone network location 106) as shown at box 325. The SNIP waits for an SS7 Answer Message (ANM) message to indicate that the call has been answered. The IVR application bridges the initiating telephone number and the first termination telephone number together through the SNIP 130.

Upon answering the telephone call at the first termination 106, the SNIP 130, for example, the billing server 208, initiates the first call record for the first toll-free telephone number at box 330. The first call record may include, for example, information regarding the calling party initiating telephone number, the first toll-free telephone number, the first termination telephone number, and the connection time between the initiating telephone number and the first terminating telephone number. It will be apparent that some call parameters, such as the connection time, may be continually determined, or determined at a later time, such as closing of the call record. The SNIP has capabilities for monitoring (i.e., listening-in) to the toll-free telephone call and determining how long the connection lasts (i.e., by timing the telephone connection). The first termination telephone number may be the telephone network location 106 corresponding to a company switchboard, a company PBX, or an IVR at the terminating telephone number. In an alternative embodiment, the first termination may instead be an IVR 134 of the SNIP 130, where the toll-free subscriber subscribes to an IVR service. In this case, the SNIP has capabilities for searching a database for other telephone service subscriptions corresponding to the toll-free telephone number, and determining that calls to the first toll-free telephone number are to be forwarded to the IVR 134 of the SNIP 130, as the first termination telephone number. Such a database may be maintained, for example, within the memory device 210 of the SNIP 130.

The SNIP 130 then monitors the toll-free telephone call for an indication that the telephone call is to be transferred to, or conferenced with, an additional toll-free telephone number, as shown at box 335. Such an indication may be provided by a DTMF signal entered during the telephone call, for example, by the calling party, or a party at the first termination network location 106. For example, various options may be presented by a IVR at the first termination telephone number, for example, dial "1" for human resources, dial "2" for customer service, etc...., where the selection by the calling party initiates the transfer or conference. Where the toll-free telephone call was transferred to the IVR 134 of the SNIP 130, the indication may be provided by DTMF signal(s) provided in a similar fashion by the calling party responding to IVR 134 options. In the alternative, the signal indicating a transfer to or conference with a second toll-free telephone number may be provided, for example, by call-forwarding capabilities that may be provided at the SNIP 130, or by an operator at the first termination entering a predetermined DTMF sequence indicating a desire to transfer the telephone call.

It is then determined at the SNIP 130 whether a transfer to a second toll-free telephone number is indicated at box 340, for example, by determining whether a DTMS sequence indicating a desire to transfer has been entered during the telephone call. Where a transfer is indicated at box 340, the first call record for the first toll-free telephone number may be closed at box 345. For example, the SNIP 130 may determine a connection time for the connection between the initiating telephone number and the first termination telephone number, and update the call record with the connection time information. The SNIP 130, for example, via the switch 132, possesses capabilities for maintaining the telephone call in a suspended state, and determining a second termination telephone number, for example, for the second termination 108 corresponding to the second toll-free telephone number at box 350, to which the calling party is connected. For example, after determining the second termination telephone number, the SNIP sends an SS7 IAM to the portion of the telephone network servicing the second termination telephone number to initiate the call setup to the second termination, and waits for an SS7 ANM message. The connection with the first termination is then dropped by the SNIP 130. The second termination telephone number may be determined in a similar fashion as the determination of the first termination telephone number discussed above with respect to box 320.

Once an SS7 ANM message is received, the SNIP bridges the initiating and second termination 108. Upon answering of the telephone call at the second termination telephone number, a second call record may be initiated by the SNIP 130, for example, the billing server 208, at box 355. The second call record may include, for example, information regarding the calling party initiating telephone number, the second toll-free telephone number, the second termination telephone number, and the connection time between the initiating telephone number and the second terminating telephone number. The SNIP 130 has capabilities for monitoring (i.e., listening-in) the toll-free telephone call transferred to the second toll-free telephone number, and determining how long the connection lasts (i.e., timing the telephone connection). Similar to as discussed above with respect to box 330, the second termination telephone number may be the network location 108 corresponding to a company switchboard, a company PBX, or an IVR at the second terminating telephone number. In an alternative embodiment, the second termination may instead be an IVR 134 of the SNIP 130. The second call record may then be closed at box 360 upon completion of the telephone call between the initiating telephone number and the second termination telephone number. Although not shown, it will be appreciated that a failed transfer attempt at boxes 340-350 may reconnect the first termination with the initiating party to prevent a dropped call.

Where it is determined that a transfer is not indicated at box 340, it may be determined at box 365 whether a conference is indicated, for example, by determining whether a DTMF sequence indicating a conference has been entered during the telephone call. Where no indication of a conference is determined, flow returns to box 335, and continues as discussed above. It will be appreciated, that although not shown, a determination as to whether the call is complete may be made, where the first call record is closed upon completion of the telephone call.

Where it is determined that a conference is indicated at box 365, flow continues to box 370, where the second termination telephone number corresponding to the second toll-free telephone number is determined. The SNIP 130, for example, via the switch 132, possesses capabilities for maintaining the telephone call in a suspended state, and for determining the second termination telephone number corresponding to the second toll-free telephone number. This may be accomplished in a similar fashion as determining the first termination telephone number discussed above with respect to box 320. After determining the second termination telephone number, the SNIP sends an SS7 IAM to the portion of the telephone network servicing the second termination telephone number to initiate the call setup to the second termination, and waits for an SS7 ANM message. Once an SS7 ANM message is received, the SNIP bridges the initiating, the first, and the second termination telephone numbers.

As shown at box 375, the second call record is initiated. The initiating of the second call record of box 375 may be accomplished in a similar fashion as discussed above with respect to box 355. As shown at box 380, the first and second call records may be closed upon termination of the respective call leg between the initiating telephone number and the first and second terminations 106 and 108.

Figure 4:
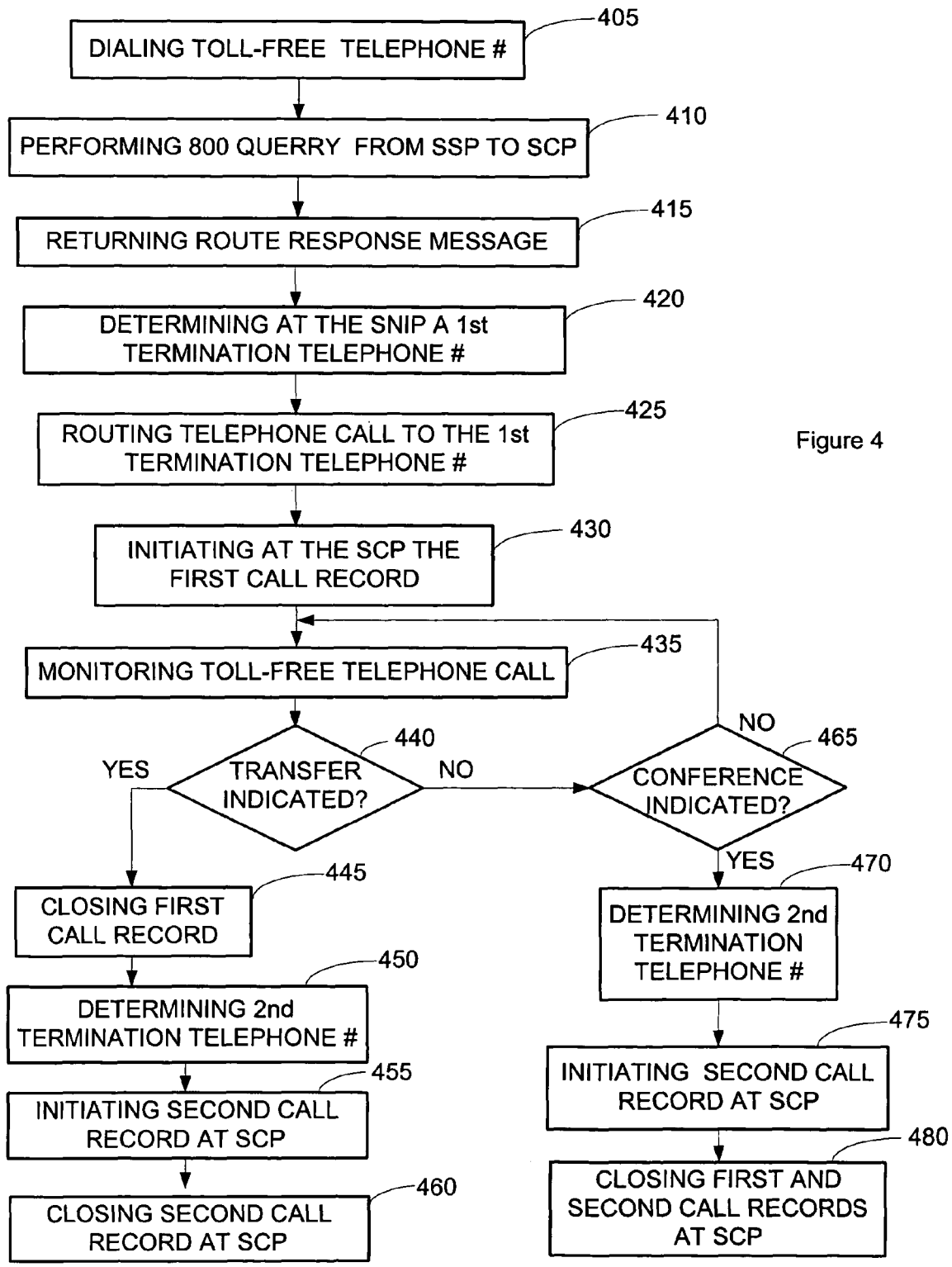
FIG. 4 is a flowchart illustrating operation of the telephone network of FIG. 1 in providing toll-free telephone call billing, where call records are generated at a Service Control Point, in accordance with another embodiment of the disclosure.

FIG. 4 is a flow chart illustrating operation of the telephone network of FIG. 1 in billing a toll-free telephone call, in accordance with an embodiment of the disclosure. The flowchart of FIG. 4 will be discussed in relation to the telephone network 100 of FIG. 1, where the SNIP 130 uses capabilities at the SCP 122 for generating call records for billing.

As shown at box 405, a calling party 104 dials a first toll-free telephone number from an initiating telephone number. At box 410, the SSP 110 performs an 800 query with the SCP 122, using for example, the SS7 communications protocol. At box 415, the SCP 122 returns a routing response message indicating that the toll-free telephone subscriber subscribes to the billing service, and returns an SS7 Analyze Route Message used in the routing of the telephone call to the switch and trunk group serving the SNIP 130 using the SS7 communications protocol. The SNIP then determines the first termination number corresponding to the toll-free telephone number at box 420. This may be accomplished, for example, by the SNIP 130 searching an internal database, such as the database within the memory device 210 of the SNIP. The memory device may include, for example, a list of toll-free telephone numbers with corresponding termination telephone numbers. In the alternative, the SNIP 130 may directly query the SCP 122 for the proper termination number corresponding to the first toll-free telephone number.

Upon determining the first termination telephone number, the SNIP 130 sends an SS7 IAM to a particular portion of the telephone network to initiate the call setup to the first termination telephone number, and routes the telephone call to the first termination (i.e., telephone network location 106) as shown at box 425. The SNIP waits for an SS7 Answer Message (ANM) message to indicate that the call has been answered. The IVR application bridges the initiating telephone number and the first termination telephone number together through the SNIP 130. When the SS7 ANM message is received, the SNIP 130 indicates to the SCP that the call is answered, and the SCP initiates the first call record for the first toll-free telephone number at box 430. Communications between the SNIP 130, for example, the SS7 server 204 of the SNIP, and the SCP may take the form of, for example, Intelligent Network Application Protocol (INAP) messages. Such INAP messages maybe in a predetermined convention for transmitting the various information between the SNIP 130 and the SCP 122 described herein.

The first call record may include, but is not limited to, information provided from the SNIP 130, for example, the calling party initiating telephone number, the first toll-free telephone number, the first termination telephone number, and a call begin time and call end time (at completion of the particular call leg) indicating at what times the connection between the initiating telephone number and the first terminating telephone number has commenced, and was terminated, respectively. The call begin time and call end time may be used by the SCP in determining a connection time between the initiating telephone number and the first termination, for example, where the SCP determines the difference between the call end time and the call begin time. In the alternative, the SNIP may have capabilities for timing the telephone connection between the initiating telephone number and the first termination, and sending the connection time to the SCP. In this case, the begin call time and end call time may be unnecessary, unless desired for reasons such as reduced rates for calls occurring within particular time periods of a day, or particular days of the week. As discussed above, the first termination telephone number may be the telephone network location 106 corresponding to a company switchboard, a company PBX, or an IVR at the terminating telephone number. Alternatively, the first termination may instead be a IVR 134 of the SNIP 130, where the toll-free subscriber subscribes to an IVR service.

The SNIP 130 then monitors the toll-free telephone call for an indication that the telephone call is to be transferred, as shown at box 435. Such an indication may be provided by a DTMF signal entered during the telephone call, for example, by the calling party, or a party at the first termination network location 106. For example, various options may be presented by an IVR at the first termination telephone number, for example, dial "1" for human resources, dial "2" for customer service, etc. . . . , where the selection by the calling party initiates the transfer or conference. Where the telephone call was transferred to the IVR 134 of the SNIP 130, the indication may be provided by DTMF signal(s) provided in a similar fashion by the calling party responding to IVR 134 options. In the alternative, the signal indicating a transfer to or conference with a second toll-free telephone number may be provided, for example, by call-forwarding capabilities that may be provided at the SNIP 130, or by an operator a the first termination entering a predetermined DTMF sequence indicating a desire to transfer the telephone call.

It is then determined at the SNIP 130 whether a transfer to a second toll-free telephone number is indicated at box 440, for example, by determining whether a DTMS sequence indicating a desire to transfer has been entered during the telephone call. Where a transfer is indicated at box 440, the SNIP indicates an intent to transfer to the SCP 122, and the SCP 122 closes the first call record for the first toll-free telephone number at box 445. The SNIP 130, for example, via the switch 132, possesses capabilities for maintaining the telephone call in a suspended state, and determining a second termination telephone number corresponding to the second toll-free telephone number at box 450, to which the calling party is connected. For example, after determining the second termination telephone number, the SNIP sends an SS7 IAM to the portion of the telephone network servicing the second termination telephone number to initiate the call setup to the second termination, and waits for an SS7 ANM message. Upon receiving the SS7 ANM message, the connection with the first termination telephone number is dropped, and the initiating and second termination telephone numbers are bridged through the SNIP 130. The second termination telephone number may be determined in a similar fashion as the determination of the first termination telephone number discussed above with respect to box 420.

Upon answering of the telephone call at the second termination telephone number, the SNIP indicates the transfer was answered to the SCP 122, and a second call record is initiated by the SCP 122 at box 455. The second call record may include, for example, information provided from the SNIP 130 such as the calling party initiating telephone number, the second toll-free telephone number, the second termination telephone number, and a call begin time and call end time (at completion of the particular call leg) indicating at what times the connection between the initiating telephone number and the second terminating telephone number has commenced, and was terminated, respectively. The call begin time and call end time may be used by the SCP in determining a connection time between the initiating telephone number and the first termination, for example, where the SCP determines the difference between the call end time and the call begin time. In the alternative, the SNIP may have capabilities for timing the telephone connection between the initiating telephone number and the second termination, and sending the connection time to the SCP.

Similar to as discussed above with respect to box 430, the second termination telephone number may be the network location 108 corresponding to a company switchboard, a company PBX, or an IVR at the second terminating telephone number. In an alternative embodiment, the second termination may instead be a IVR 134 of the SNIP 130. The second call record may then be closed by the SCP 122 at box 360, upon an indication from the SNIP 130 that the telephone call between the initiating telephone number and the second termination telephone number has been completed, including an end call time for the connection between the initiating telephone number and the second termination 108.

Where it is determined that a transfer is not indicated at box 440, it may be determined at box 465 whether a conference is indicated, for example, by determining whether a DTMF sequence indicating a conference has been entered during the telephone call. Where no indication of a conference is determined, flow returns to box 435, and continues as discussed above. It will be appreciated, that although not shown, where no transfer or conference are indicated at boxes 440 or 465, a determination as to whether the call has ended/terminated without any transfer or conference with an additional toll-free telephone number may be made, where the first call record is closed upon completion of the telephone call.

Where it is determined that a conference is indicated at box 465, flow continues to box 470, where the second termination telephone number corresponding to the second toll-free telephone number is determined. The SNIP 130, for example, via the switch 132, possesses capabilities for maintaining the telephone call in a suspended state, and for determining a second termination telephone number corresponding to the second toll-free telephone number, in a similar fashion as discussed above with respect to box 420. For example, after determining the second termination telephone number, the SNIP sends an SS7 IAM to the portion of the telephone network servicing the second termination telephone number to initiate the call setup to the second termination, and waits for an SS7 ANM message. Upon receiving the SS7 ANM message, the connection between the initiating, first and second termination telephone numbers is bridged through the SNIP 130.

As shown at box 475, the second call record is initiated by the SCP. The initiating of the second call record of box 475 may be accomplished by the SCP 122 in a similar fashion as discussed above with respect to box 455, where the SNIP 130 sends a message to the SCP 122 providing, inter alia, information regarding the begin call time for the connection between the calling party and the second termination 108. As shown at box 480, the SCP may close the first and second call records upon an indication from the SNIP that termination of the respective call leg between the initiating telephone number and the first and second terminations 106 and 108 has occurred. For example, the SNIP 130, upon detecting the termination of the respective call leg, may send a message to the SCP 122 including, inter alia, information regarding the end call time for that call leg connection. The SCP 122 may then determine the connection time for the respective call leg, for example, by taking a difference between the end call time and the begin call time for the call leg, for use in the call record.

Although only first and second call records are shown as being generated with respect to the Flowcharts of FIGS. 3 and 4, it will be appreciated that any number of call records may be generated, where the SNIP 130 may remain in the call loop and detect additional indications to transfer or conference the toll-free telephone call between the calling party and second termination. Such additional call records may be generated by the SNIP 130 or the SCP 122, in a similar fashion as discussed above with respect to boxes 340-380 and boxes 440-480, respectively.

Figure 5:
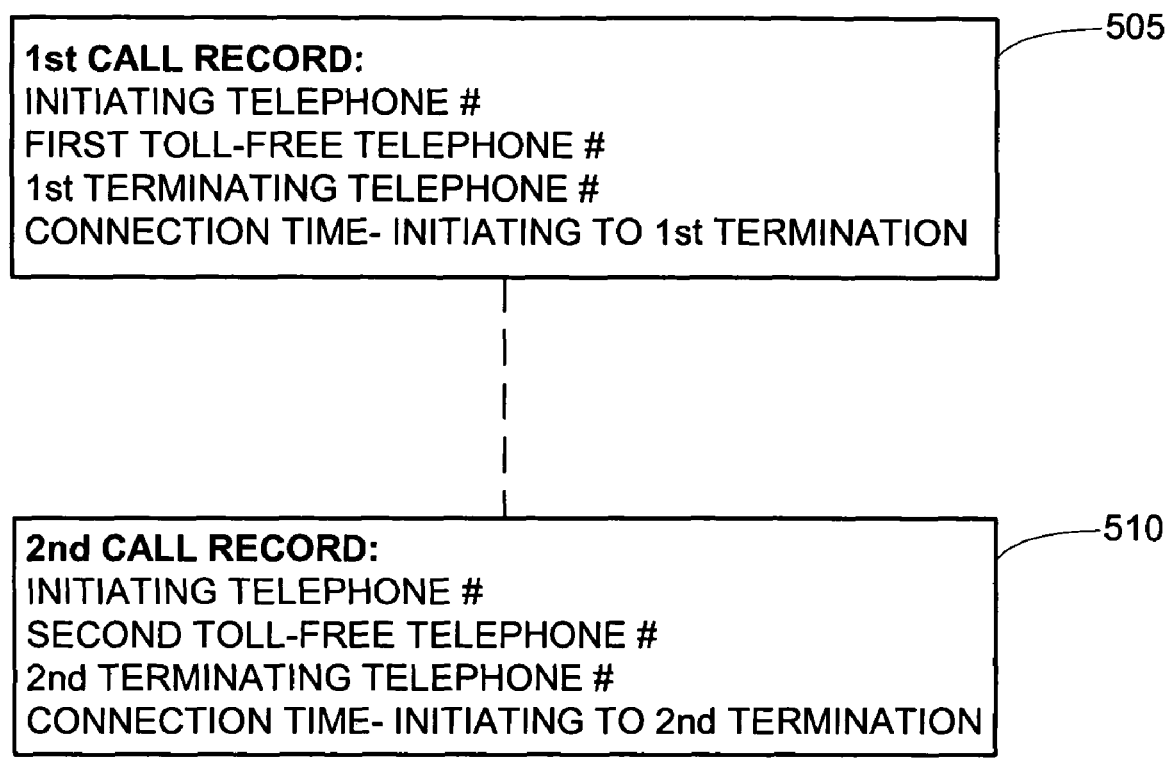
FIG. 5 illustrates exemplary call records that may be generated, in accordance with an embodiment of the disclosure.

FIG. 5 illustrates exemplary call records that may be generated where a call is transferred to, or conferenced with, a second toll-free telephone number, in accordance with an embodiment of the disclosure. The call records shown in FIG. 5 may be generated, for example, by the SNIP 130 in accordance with Flowchart 3, and may be generated by the SCP 122, in accordance with the Flowchart of FIG. 4.

As shown in FIG. 5, a first call record represented at 505 may include information such as an initiating telephone number, a first toll-free telephone number, a first terminating telephone number, and a connection time between the initiating telephone number and the first terminating telephone number. Further, although not shown, the first call record 505 may include, but is not limited to, information such as, feature identifiers (i.e., that occurred during call processing logic such as announcements, activation of authorization codes, etc. . . . ), begin call time, end call time, payphone indicators, and international indicators. Where the call record is generated at the SNIP 130, the connection time may be determined by the SNIP 130 timing the connection between the initiating telephone number and the first termination. Where the SCP 122 generated the call record, the connection time may be determined as discussed above, where the SNIP sends one or more INAP messages to the SCP indicating a begin call time and end call time for a connection between the initiating telephone number and the first termination, and the SCP determines a connection time by determining the difference between the end call time and the begin call time for the connection.

A second call record represented at 510 may include information such as an initiating telephone number, a second toll-free telephone number, a second terminating telephone number, and a connection time between the initiating telephone number and the second terminating telephone number. Further, although not shown, the second call record 510 may include, but is not limited to, information such as, feature identifiers (i.e., that occurred during call processing logic such as announcements, activation of authorization codes, etc. . . . ), begin call time, end call time, payphone indicators, and international indicators. The second connection time may be determined in a similar fashion to that discussed above with respect to the first call record 505.

As discussed above, the first call record is initiated when a call to the toll-free number is answered at the first terminating location. The first call record is closed when a transfer to another toll-free telephone number is initiated, or when a conferenced call between the initiating telephone number and the first and second termination telephone numbers is terminated.

The second call record is initiated when the transferred or conferenced call is answered at the second termination. The second call record may be closed when the transferred or conferenced call is either terminated, or the call is transferred to yet another toll-free telephone number. Although only two call records are shown in FIG. 5, one skilled will appreciate that any number of call records may be generated by the SNIP 130 and/or SCP 122 in the fashion discussed above.

Where a transfer or conference between a calling party and multiple toll-free telephone numbers occurs during a toll-free telephone call, having the SNIP for initiating the first and second call records allows toll-free billing to multiple toll-free telephone numbers through the generation of call records for each toll-free number involved in the toll-free telephone call. Thus, a toll-free telephone number holder is billed only for charges incurred on the leg of the toll-free telephone call corresponding to the holder's toll-free telephone number. In addition, as the call records are generated at the service node, PSTN resources need not be consumed by messages generated between multiple SSPs to accomplished billing for the telephone call. Further, complex programming infrastructure need not be implemented to re-associate multiple call records for various legs of the telephone call, in contrast to where multiple SSPs bill respective legs of a toll-free telephone call. Additionally, SSP call records are not needed for the toll-free telephone call billing, and the SNIP and/or SCP may provide more detailed billing capabilities than those generated by the SSP.

In accordance with another embodiment of the disclosure, a toll-free telephone call to a toll-free telephone number may be billed to a billing toll-free telephone number other than that dialed by the calling party. In one case, described below with respect to FIG. 6, the entire toll-free telephone call charges may be billed to a billing telephone number, where the billing telephone number is not involved with (i.e., not a party to) the toll-free telephone call. In another case, described below with respect to FIG. 7, charges for a toll-free telephone call that is transferred from the dialed toll-free telephone number to a second toll-free telephone number (not dialed by the calling-party) may be charged to the second toll-free telephone number.

Figure 6:
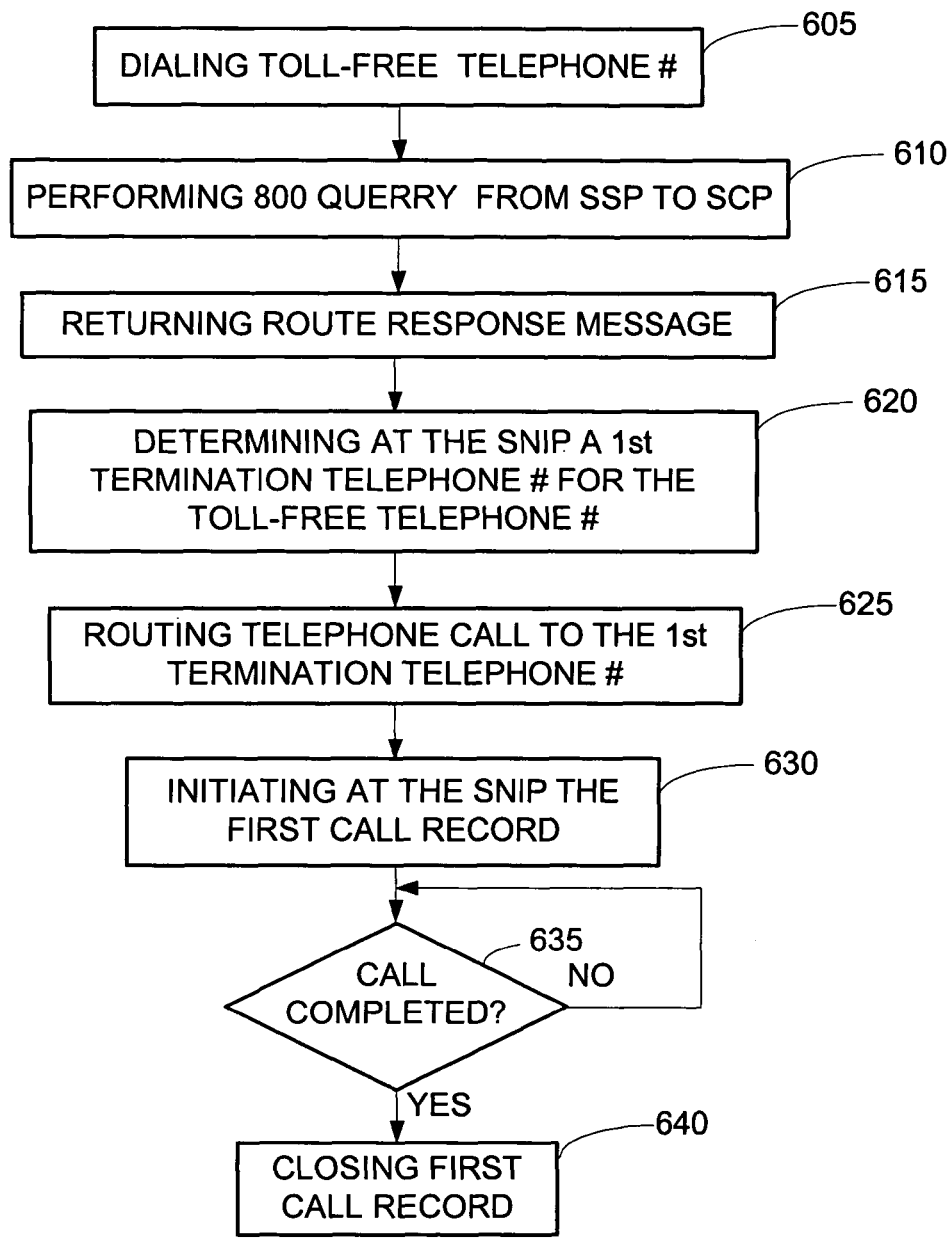
FIG. 6 is a flowchart illustrating operation of the telephone network of FIG. 1 in providing toll-free telephone call billing, where a toll-free telephone call to a toll-free telephone number is billed to a billing toll-free telephone number other than the dialed toll-free telephone number, in accordance with an embodiment of the disclosure.

FIG. 6 is a flowchart illustrating operation of the telephone network of FIG. 1 in providing toll-free telephone call billing, where a toll-free telephone call to a toll-free telephone number is billed to a billing toll-free telephone number other than the toll-free telephone number dialed by the calling party, in accordance with an embodiment of the disclosure. Boxes 605-625 of FIG. 6 are accomplished in a similar fashion as boxes 305-325 of FIG. 3, and will not be discussed in detail.

After routing the toll-free telephone call to the first termination telephone number at box 625, the first call record is initiated at the SNIP, for example by the billing server 208, as shown at box 630. The first call record may include, for example, information regarding the calling party initiating telephone number, a billing toll-free telephone number that is not involved with the toll-free telephone call (i.e., providing an indication to which toll-free telephone number the toll-free telephone call is to be billed), the first termination telephone number, and the connection time between the initiating telephone number and the first terminating telephone number. It will be apparent that some call parameters, such as the connection time, may be continually determined, or determined at a later time, such as at closing of the call record.

In determining the billing toll-free telephone number to which the toll-free telephone call is to be billed, the application server 202 may search a database of the memory device 210 (not shown) that includes toll-free telephone numbers and corresponding billing toll-free telephone numbers. The application scripts 212, 214 may indicate to the application server 202 to search the database for the dialed toll-free telephone number, and to use the corresponding billing toll-free number from the database in the call record for use in billing the toll-free telephone call. Thus, the billing server 208 generates the call record to include the billing toll-free telephone number to be used to bill the toll-free telephone call, instead of the toll-free telephone number dialed by the calling party.

In addition, or in the alternative, the application scripts 212, 214 may indicate to the application server that toll-free telephone calls having a particular termination are to be billed to a billing toll-free telephone number that is not involved with the toll-free telephone call. Such terminations may include a plain old telephone service (POTS) telephone number serving as a termination telephone number for the dialed toll-free telephone number and/or may include a designation switch and/or trunk group.

In the case of the former, the application server 202 may search a database at the memory device 210 including POTS telephone numbers, and associated billing toll-free telephone numbers to be used for billing. The billing toll-free telephone number from the database that is associated with the POTS telephone number termination for the dialed toll-free telephone number is used as the billing toll-free telephone number to be billed in the call record. Thus, the billing server 208 generates the call record to include the billing toll-free telephone number for use in billing the telephone call, instead of the toll-free telephone number dialed by the calling party. In the case of the latter, the application server 202 may search a database at the memory device 210 including switch and/or trunk identifications (IDs), and associated billing toll-free telephone numbers to be used for billing toll-free telephone calls terminating at such switch or trunk IDs. The billing toll-free telephone number from the database that is associated with the trunk ID termination for the dialed toll-free telephone number is used as the toll-free telephone number to be billed in the call record for the toll-free telephone call. Thus, the billing server 208 generates the call record to include the billing toll-free telephone number used to bill the telephone call, instead of the toll-free telephone number dialed by the calling party.

The SNIP has capabilities for monitoring (i.e., listening-in) to the toll-free telephone call and determining how long the connection lasts (i.e., by timing the telephone connection). The first termination telephone number may be the telephone network location 106 and associated with a company switchboard, a company PBX, or an IVR at the terminating telephone number. In an alternative embodiment, the first termination may instead be associated with an IVR 134 of the SNIP 130, where the toll-free subscriber subscribes to an IVR service. In this case, the SNIP has capabilities for searching a database for other telephone service subscriptions corresponding to the toll-free telephone number, and determining that calls to the first toll-free telephone number are to be forwarded to the IVR 134 of the SNIP 130, as the first termination telephone number. Such a database may be maintained, for example, within the memory device 210 of the SNIP 130.

After the first call record is initiated at block 630, the toll-free telephone call is monitored by the SNIP 130 to determine whether the telephone call has been completed, as shown at block 635. If it is determined that the telephone call has not been completed, flow returns to block 635. However, where it is determined that the telephone call has been completed at block 635, the first call record for the toll-free telephone call is closed by the billing server 208, as shown at block 640. Closing the call record may include determining the connection time between the initiating telephone number and the first termination, and placing the connection time into the call record.

FIG. 7 is a flowchart illustrating operation of the telephone network of FIG. 1 in providing toll-free telephone call billing, where a toll-free telephone call to a toll-free telephone number is billed to a billing toll-free telephone number other than the toll-free telephone number dialed by the calling party, in accordance with another embodiment of the disclosure. Boxes 705-715 and 725-730 of FIG. 7 are accomplished in a similar fashion as respective boxes 305-315 and 320-325 of FIG. 3, and will not be discussed in detail. Further, boxes

740-745 of FIG. 7 are accomplished in a similar fashion as boxes 635-640 of FIG. 6, and will not be discussed in detail.

As shown at box 720, a second toll-free telephone number to which to transfer the toll-free telephone call is determined. For example, such toll-free telephone number may be determined based on the location of the calling party, to transfer the toll-free telephone call to a company branch appropriate for serving the calling party. In the alternative, the second toll-free telephone number may be determined based on an IVR selection by the calling party, for example, to be transferred to a particular department of the company such as a customer service department. Other criteria may be utilized for determining a second toll-free telephone number used in transferring the telephone call. Such determination may be made by the application engine 202, operating under application scripts 212, 214, searching a database (not shown) of the memory device 210 for a second toll-free telephone number to which the toll-free telephone call is to be transferred. For example, such database may be a location-dependent routing and/or time-dependent routing database maintained at the memory device 210, where the toll-free telephone number holder subscribes to such services. The database is searched using criteria, such as a location of the calling party, a time of the telephone call and/or the day of the week that the telephone call was made, that may be used to retrieve the appropriate second toll-free telephone number from the database. Geographic-based or date/time-based call transfer is discussed in more detail in U.S. patent application Ser. No. 10/903,829, entitled "Subscriber Alterable Locator Service" to Crockett et al., filed on Jul. 30, 2004, the contents of which are incorporated by reference herein.

Upon determining the second toll-free telephone number at box 720, a terminating telephone number for the second toll-free telephone number may be determined at box 725 in a similar fashion as discussed above with respect to box 320 of FIG. 3. The toll-free telephone call is then routed to the terminating telephone number, as shown at box 730, in a similar fashion as discussed above with respect to box 320 of FIG. 3.

After routing the toll-free telephone call to the second termination telephone number at box 730, the first call record is initiated at the SNIP, specifically by the billing server 208, as shown at box 735. The first call record may include, for example, information regarding the calling party initiating telephone number, a billing toll-free telephone number that is different from the first toll-free telephone number dialed by the calling party (i.e., providing an indication to which toll-free telephone number the toll-free telephone call is to be billed), the first termination telephone number, the second termination telephone number, any connection time between the initiating telephone number and the first terminating telephone number, and the connection time between the initiating telephone number and a second termination telephone number determined telephone number corresponding to the second toll-free telephone number. It will be apparent that some call parameters, such as the connection time, may be continually determined, or determined at a later time, such as at closing of the call record.

In determining the billing toll-free telephone number to which the toll-free telephone call is to be billed, the billing server 208 generates the call record to include the second toll-free telephone number to which the toll-free telephone call was transferred as the billing toll-free telephone number for billing the toll-free telephone call, instead of the toll-free telephone number dialed by the calling party.

After initiating the first call record at block 735, the toll-free telephone call is monitored by the SNIP 130 to determine whether the telephone call has completed, as shown at block 740, in a similar fashion as discussed with respect to box 635 of FIG. 6. Where it is determined that the telephone call has been completed at block 740, the first call record for the toll-free telephone call is closed as shown at block 745 in a similar fashion as discussed above with respect to block 640 of FIG. 6. For example, the application engine 202 may determine the connection time for the toll-free telephone call between the initiating telephone number, and the telephone termination determined at box 720, as well as any connection time, IVR time and/or feature counts for the connection for the initializing telephone number with the first, dialed toll-free telephone number, and the billing server 208 may update the first call record accordingly.

By having the SNIP providing the capability for billing a toll-free telephone call to a billing toll-free telephone number different from the dialed toll-free telephone number is advantageous, as it allows a toll-free telephone number holder, such as a company, to better manage their toll-free telephone number charges.

Where the SNIP provides capabilities for billing a toll-free telephone call to a toll-free telephone number not involved with the toll-free telephone call (i.e., not a party to the toll-free telephone call), all billings for toll-free telephone calls may be accumulated to a single toll-free telephone number. Thus, especially where the company desires to pay all toll-free telephone charges from a particular company location or department, the toll-free telephone charges are easily assessed, as they are all charged to a single toll-free telephone number.

Where a first toll-free telephone number that is transferred to a second toll-free telephone number, with the SNIP providing capabilities for billing the charges for the toll-free telephone call to the second toll-free telephone number, a toll-free telephone number holder such as a company is able to better allocate toll-free calls made to a centralized toll-free telephone number for the company. For example, charges for toll-free telephone calls transferred from the company centralized toll-free telephone number to other toll-free telephone numbers corresponding to company branches or company departments, may easily be allocated to the respective company branch or department to which they were transferred, as the charges for the toll-free telephone call are charged to the transferred-to (i.e., second) toll-free telephone number.

It will be appreciated to one skilled in the art that generating a call record for use in billing a toll-free telephone call placed to a toll-free telephone number to a billing toll-free telephone number, as described above with respect to FIGS. 6 and 7, may be accomplished at an SCP such as the SCP 122, in a fashion similar to the generation of call records at the SCP 122 discussed above with respect to FIG. 4.

FIG. 8 illustrates an exemplary call record that may be generated for a toll-free telephone call billed to a billing toll-free telephone number other than the dialed toll-free telephone number, in accordance with an embodiment of the disclosure. The call record of FIG. 8 may be generated, for example, as a result of billing in accordance with the flowchart of FIG. 6.

As shown in FIG. 8, the first call record represented at 805 may include information such as an initiating telephone number, a billing toll-free telephone number (indicating the toll-free telephone number to which the toll-free telephone call is to be billed), a first termination telephone number, and a connection time between the initiating telephone number and the termination telephone number. Further, although not shown, the first call record 805 may include, but is not limited to, information such as feature identifiers (i.e., that occurred during call processing logic such as announcements, activation of authorization codes, etc. . . . ), begin call time, end call time, payphone indicators, and international indicators. Where the call record is generated at the SNIP 130, the connection time may be determined by the SNIP 130 timing the connection between the initiating telephone number and the first termination. Where the SCP 122 generates the call record, the connection time may be determined as discussed above, where the SNIP sends one or more INAP messages to the SCP indicating a begin call time and end call time for a connection between the initiating telephone number and the first termination, and the SCP determines a connection time by determining the difference between the end call time and the begin call time for the connection.

Figure 9:
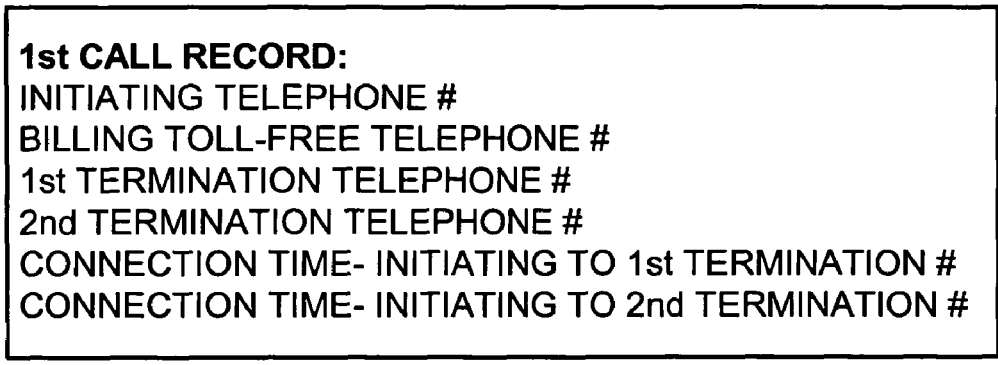
FIG. 9 illustrates an exemplary call record that may result from the billing described in the flowchart of FIG. 7, in accordance with an embodiment of the disclosure.

FIG. 9 illustrates an exemplary call record that may be generated for a toll-free telephone call billed to a billing toll-free telephone number other than the dialed toll-free telephone number, in accordance with an embodiment of the disclosure. The call record of FIG. 9 may be generated, for example, as a result of billing in accordance with the flowchart of FIG. 7.

As shown in FIG. 9, the first call record represented at 905 may include information such as an initiating telephone number, a billing toll-free telephone number (indicating the toll-free telephone number to which the toll-free telephone call is to be billed), a first termination telephone number, a second termination telephone number, a connection time between the initiating telephone number and the first termination telephone number (where appropriate, for example, where an operator at the first termination transfers the toll-free telephone call to the second toll-free telephone number), and a connection time between the initiating telephone number and the second termination telephone number. Further, although not shown, the first call record 905 may include, but is not limited to, information such as feature identifiers (i.e., that occurred during call processing logic such as announcements, activation of authorization codes, etc. . . . ), begin call time, end call time, payphone indicators, and international indicators that may be incurred before or after the transfer to the second toll-free telephone number. Where the call record is generated at the SNIP 130, for example, the billing server 218, the connection time may be determined by the SNIP 130, timing the connection between the initiating telephone number and the first termination telephone number, and between the initiating telephone number and the second termination telephone number. Where the SCP 122 generates the call record, the connection time may be determined as discussed above, where the SNIP 130 sends one or more INAP messages to the SCP indicating a begin call time and end call time for a connection between the initiating telephone number and the first termination and second termination telephone numbers, and the SCP determines a connection time by determining the difference between the end call time and the begin call time for the particular connection.

The billing information for the call records discussed above may be stored as one or more database files at the memory device 210 of the SNIP 130. For example, the call record information for the first call record may be stored in the memory device 210 as a database file and include information for database fields including, but not limited to, initiating telephone number, toll-free telephone number, termination (i.e., terminating telephone number), length of time of the connection between the initiating telephone number and the terminating telephone number. For example, the database fields of the database file for the first call record may be populated with the initiating (calling party) telephone number, the first toll-free telephone number, the first terminating party telephone number, and the length of the connection between the initiating telephone number and the first terminating telephone number, respectively. It will be appreciated that additional information may be maintained within the billing database records. Where the call record is maintained at a database of an SCP, it will be appreciated that a begin time and end time field may be provided for use in determining the connection time for a particular telephone call, or telephone call leg.

Similarly, the call record information for the second call record generated during the telephone call where the call is transferred to, or conferenced with, a second toll-free telephone number may be stored in the memory device 210 using the same database fields. For example, the database fields for the second call record may by populated with the initiating (calling party) telephone number, the second toll-free telephone number, the second terminating party telephone number, and the length of the connection between the initiating telephone number and the second terminating telephone number, respectively. It will be appreciated that additional information may be maintained within the billing database records. For example, and as discussed above, where the call record is maintained at a database of an SCP, it will be appreciated that a begin time and end time field may be provided for use in determining the connection time for a particular telephone call, or telephone call leg. Additional call records from further transfers to, or conferences with, additional toll-free telephone numbers, may also be generated.

The generation of the multiple call records during the call may be accomplished while the call is occurring, as discussed above with the Flowcharts of FIGS. 3, 4, 6 and 7. In the alternative, the information used in the generation of the call records may be maintained until after all transfers and/or conferences of the initiating telephone number with toll-free telephone numbers are terminated, at which time, the SNIP or the SCP 122 may use the retained information including length of time of each connection, to generate the call records for each toll-free telephone number involved in the telephone call initiated by the calling party. The call records may be uploaded to the billing server 124 just after creation. In the alternative, the call records generated at the SNIP and/or SCP may be stored at the memory device 210, and uploaded at predetermined times, for example once, twice, or any other number of preset times during a particular day. Where the SCP generates the call records, the records may be stored at a memory device located at the SCP (not shown). Similarly, the call records may be uploaded to the billing server 124 in real-time or near real-time, or may be uploaded at predetermined times during the day.

Were the SNIP 130 generates the call records, the application engine 202 may be programmed to retain the billing information, and to instruct the billing server 208 to generate corresponding call records for each toll-free telephone number involved in the telephone call. The application engine 202 may be further programmed to store the call record information in the appropriate field of one or more database files maintained at the memory device 210, or to instruct the billing server 208 to store such information.

The various database file formats for the call records discussed above are exemplary, and one skilled in the art would realize that any number of database entries may be provided for each of the respective database files. Further, one skilled will appreciate that the information stored in the various databases described as being maintained at the memory device 210 may be maintained in a single database file, or any other number of database files, so long as the application engine 202 is programmed with information regarding from which database(s) to retrieve the various information stored. Further, although the information is described as being stored in the form of one or more database files at the memory device 210, one skilled will realize that the information may be stored in other formats, so long as the application engine 202 is sufficiently programmed for retrieving the data.

Although the system of FIG. 1 is shown with a connection between the SCP 122, the SNIP 130, and the Billing Server 124, it will be appreciated that other configurations may be possible. For example, where the SNIP 130 has capabilities for generating call records, the SNIP 130 need not be coupled with the SCP 122, and the SCP 122 need not be coupled with the Billing Server 124.

Further, although the SNIP has been described above as being a Service Node/Intelligent Peripheral, it will be apparent to one skilled in the art that the SNIP need not posses characteristics that would define it as an intelligent peripheral (i.e., have Intelligent peripheral capabilities), while still achieving the advantages discussed herein.

In addition, where AIN services are not present in a particular portion of the telephone network, one or more telephone switches within the telephone network may be programmed to route the toll-free telephone calls to the SNIP 130. The SNIP 130 then determines the terminating number for the toll-free telephone number, and routes the call in a similar fashion as described above, looping the toll-free call through the SNIP. The SNIP 130, for example, the billing server 208, may then generate one or more call records for the call as described above. It will be apparent, that although the SNIP 130 has been described as being a separate network entity, the functionality described with respect to the SNIP may be incorporated in other telephone network components, for example, an SCP, or SSP, of the telephone network, while achieving the advantages discussed herein.

While various embodiments of the disclosure have been described, it will be apparent to those of ordinary skill in the art that many more embodiments and implementations are possible within the scope of the disclosure. Accordingly, the disclosure is not to be restricted except in light of the attached claims and their equivalents.

We claim:

1. A method for use in billing a toll-free telephone call over a telephone network, the toll-free telephone call corresponding to a first toll-free telephone number and initiated by a calling party from an initiating telephone number, comprising:
   receiving the toll-free telephone call at a service node, wherein the service node communicates with a service switching point;
   routing the toll-free telephone call to a first termination corresponding with the first toll-free telephone number;
   determining a billing toll-free number for the toll-free telephone call, wherein the billing toll-free number differs from the first toll-free telephone number; and
   initiating a first call record for the toll-free telephone call.

2. The method of claim 1, wherein the initiating of the first call record includes maintaining information regarding at least one of the initiating telephone number, the first toll-free telephone number, the first termination, the billing toll-free number, and a connection time between the initiating telephone number and the first termination.

3. The method of claim 1, further comprising:
   responsive to determining that the toll-free telephone call is to be connected with a second toll-free telephone number, initiating a second call record for a connection with a second termination corresponding to the second toll-free telephone number;
   wherein the initiating of the second call record includes maintaining information regarding at least one of the initiating telephone number, the second toll-free telephone number, the second termination, and a connection time between the initiating telephone number and the second termination.

4. The method of claim 3, wherein the determining at the service node whether the toll-free telephone call is to be connected with a second toll-free telephone number includes determining whether the toll-free telephone call is to be transferred to the second toll-free telephone number, and further comprising
   closing the first call record where it is determined that the toll-free telephone call is to be transferred to the second toll-free telephone number.

5. The method of claim 3, further comprising
   closing the first call record where the first termination is no longer involved with the telephone call, and
   closing the second call record when the second termination is no longer involved with the telephone call.

6. The method of claim 3, further comprising
   determining a first termination for the first toll-free telephone number at the service node, and
   determining a second termination for the second toll-free telephone number at the service node.

7. The method of claim 3, wherein the second termination includes at least one of a second termination telephone number, a second termination switch identification, and a second termination trunk group identification.

8. The method of claim 3, wherein a service control point (SCP) is communicatively coupled with the service node, and where:
   the initiating a first call record for the toll-free telephone call at the service node includes sending information comprising at least one of the initiating telephone number, the first toll-free telephone number, the first termination, and a connection time between the initiating telephone number and the first termination to the SCP, where the SCP generates the first call record responsive to the sent information, and
   the initiating a second call record at the service node includes sending at least one of the initiating telephone number, the second toll-free telephone number, the second termination, and a connection time between the initiating telephone number and the second termination to the SCP, where the SCP generates the second call record responsive to the sent information.

9. The method of claim 1, wherein the first termination includes at least one of a first termination telephone number, a first termination switch identification, and a first termination trunk group identification.

10. A system for use in billing a toll-free telephone call over a telephone network, the toll-free telephone call corresponding to a first toll-free telephone number and initiated by a calling party from an initiating telephone number, comprising:
   a switching point for routing the toll-free telephone call to a service node of the telephone network; and
   a service node in communication with the switching point via a signaling protocol, for
      routing the telephone call from the service node to a first termination, the service node remaining within a call path of the toll-free telephone call, responsive to determining that the toll-free telephone call is to be connected with a second toll-free telephone number, routing the toll-free telephone call from the service node to a second termination, and initiating a first call record for the toll-free telephone call, wherein the first call record indicates a billing toll-free telephone number that differs from the first toll-free telephone number.

11. The system of claim 10, further comprising a service control point (SCP) communicatively coupled with the service node, wherein the service node initiating a first call record for the toll-free telephone call includes the service node sending first call leg information including at least one of the initiating telephone number, the first toll-free telephone number, the first termination, and a connection time for the call between the initiating telephone number and the first termination to the SCP, the second toll-free telephone number, the second termination, and a connection time for the call between the initiating telephone number and the second termination to the SCP, and further comprising:

the SCP generating the first call record responsive to the received first call leg information and second call leg information.

12. The system of claim 10, wherein the first termination includes at least one of a first termination telephone number, a first termination switch identification, and a first termination trunk group identification, and the second termination includes at least one of a second termination telephone number, a second termination switch identification, and a second termination trunk group identification.

13. A service node for use in billing a toll-free telephone call over a telephone network, the toll-free telephone call corresponding to a first toll-free telephone number and initiated by a calling party from an initiating telephone number, comprising:

a service node switching server for receiving via a switching protocol a toll-free telephone call routed from a switching point to the service node wherein the service node does not connect to a trunked communication line, and for routing the toll-free telephone call to the first termination, the service node remaining within the call path of the toll-free telephone call;

an application server in communication with the service node switching server, for determining whether the toll-free telephone call is to be connected with a second toll-free telephone number; and a billing server in communication with the application server, for initiating a first call record for the toll-free telephone call, wherein the first call record indicates a billing toll-free telephone number that differs from the first toll-free telephone number.

14. A non-transitory storage media for use in a service node of the telephone network for the billing of a toll-free telephone call, wherein the service node communicates via a signaling protocol with a service switching point and the service node does not connect to a trunked communication line, the toll-free telephone call corresponding to a first toll-free telephone number and initiated by a calling party from an initiating telephone number, the storage media comprising:

a first memory portion programmed for initiating a first call record at the service node for the toll-free telephone call that is routed to a first termination corresponding with the first toll-free telephone number through the service node;

a second memory portion programmed for determining whether the toll-free telephone call is to be connected with a second toll-free telephone number; and a third memory portion programmed for indicating, in the first call record, the second toll-free telephone number as the billing toll-free telephone number.

15. The storage media of claim 14, wherein a service control point (SCP) is communicatively coupled with the service node, and where the first memory portion programmed for initiating a first call record includes the first memory portion programmed for sending from the service node to the SCP at least one of the initiating telephone number, the first toll-free telephone number, the first termination, and a connection time for the call between the initiating telephone number and the first termination to the SCP for generation of the first call record, and the third memory portion programmed for sending from the service node to the SCP at least one of the billing toll-free telephone number, the second toll-free telephone number, the second termination, and a connection time for the call between the initiating telephone number and the second termination to the SCP for generation of the second call record.

16. A method for use in billing a toll-free telephone call over a telephone network, the toll-free telephone call corresponding to a first toll-free telephone number dialed by a calling party from an initiating telephone number, comprising:

receiving the toll-free telephone call at a service node via a signaling protocol wherein the service node does not carry trunked communications;

determining a termination for the toll-free telephone call at the service node;

routing the toll-free telephone call to the termination, where the service node remains within the call path of the toll-free telephone call; and initiating a call record for the toll-free telephone call at the service node, the call record including an indication to bill the toll-free telephone call to a billing toll-free telephone number different from the dialed toll-free telephone number.

17. The method of claim 16, wherein the initiating call record includes maintaining information regarding at least one of the initiating telephone number, the billing toll-free telephone number, the termination, and a connection time for the call between the initiating telephone number and the first termination.

18. The method of claim 16, wherein the initiating the call record includes determining the billing toll-free telephone number for use in billing the toll-free telephone call.

19. The method of claim 18, wherein the service node includes a database having a plurality of toll-free telephone numbers with a corresponding plurality of billing toll-free telephone numbers, and where the determining the billing toll-free telephone number for use in billing the toll-free telephone call includes locating the dialed toll-free telephone number in the database, and retrieving the corresponding billing toll-free telephone number from the database.

20. The method of claim 18, wherein the service node includes a database having a plurality of plain old telephone service (POTS) telephone numbers that are terminations for toll-free telephone numbers, and a corresponding plurality of billing toll-free telephone numbers, and where the determining the billing toll-free telephone number for use in billing the toll-free telephone call includes
- determining the POTS telephone number termination for the dialed telephone number,
- locating the POTS telephone number in the database, and
- retrieving the corresponding billing toll-free telephone number from the database.

21. The method of claim 18, wherein the service node includes a database having a plurality of trunk group identifications that are termination points for toll-free telephone numbers, and a corresponding plurality of billing toll-free telephone numbers, and where the determining the billing toll-free telephone number for use in billing the toll-free telephone call includes
- determining the trunk group identification termination for the dialed telephone number,
- locating the trunk group identification in the database, and
- retrieving the corresponding billing toll-free telephone number from the database.

22. The method of claim 16, further comprising:
- transferring the toll-free telephone call at the service node to a second toll-free telephone number; wherein
- the determining the termination includes determining a termination telephone number for the second toll-free telephone number, and where
- the billing toll-free telephone number is the second toll-free telephone number.

23. A system for use in billing a toll-free telephone call over a telephone network, the telephone call corresponding to a first toll-free telephone number dialed by a calling party from an initiating telephone number, comprising:
- a switching point for routing the toll-free telephone call to a service node of the telephone network; and
- a service node in communication with the switching point via a signaling protocol, wherein the service node does not carry voice communication, for
  - determining a termination for the toll-free telephone call,
  - routing the toll-free telephone call to the termination, where the service node remains within the call path of the toll-free telephone call, and
  - initiating a call record for the toll-free telephone call, the call record including an indication to bill the toll-free telephone call to a billing toll-free telephone number different from the dialed toll-free telephone number.

24. The system of claim 23, wherein the service node initiating the call record includes the service node maintaining information regarding at least one of the initiating telephone number, the billing toll-free telephone number, the first termination, and a connection time for the call between the initiating telephone number and the first termination.

25. The system of claim 23, wherein the service node transfers the telephone call to a second toll-free telephone number, and
- the service node determining the termination includes determining a termination for the second toll-free telephone number, and where
- the billing toll-free telephone number is the second toll-free telephone number.

26. A non-transitory storage media for use in a service node of a telephone network for billing a toll-free telephone call, the service node in communication with a service switching point via a signaling protocol wherein the service node does not carry voice communication in the telephone network, the toll-free telephone call corresponding to a first toll-free telephone number dialed by a calling party from an initiating telephone number, the storage media comprising:
- a first memory portion programmed for initiating a call record at the service node for the toll-free telephone call that is routed through the service node to a termination determined at the service node, the call record including an indication to bill the toll-free telephone call to a billing toll-free telephone number different from the first toll-free telephone number.

* * * * *